United States Patent [19]

Eissele et al.

[11] Patent Number: 5,152,804
[45] Date of Patent: Oct. 6, 1992

[54] PERMANGANATE-CONTAINING PELLETS AND METHOD OF MANUFACTURE

[75] Inventors: Ernest M. Eissele, Holland, Pa.; Edward S. Rogers, Princeton; Arno H. Reidies, LaSalle, both of Ill.

[73] Assignee: Carus Corporation, LaSalle, Ill.

[21] Appl. No.: 386,411

[22] Filed: Jul. 27, 1989

Related U.S. Application Data

[63] Continuation-in-part of Ser. No. 188,419, Apr. 29, 1988, Pat. No. 4,961,751, and a continuation-in-part of Ser. No. 279,941, Dec. 5, 1988, abandoned.

[51] Int. Cl.$^5$ .............................................. C05B 19/00
[52] U.S. Cl. ................................ 23/313 R; 8/111; 252/186.33
[58] Field of Search ............... 23/313 R; 8/101, 102, 8/107, 108.1, 110, 111; 252/186.33, 186.27, 186.34; 264/117; 258/8.6, 287.17; 52/315

[56] References Cited

U.S. PATENT DOCUMENTS

| | | | |
|---|---|---|---|
| 2,219,660 | 10/1940 | Robson et al. | 23/313 R |
| 2,657,182 | 10/1953 | Katz | 252/186.33 |
| 3,048,546 | 8/1962 | Lake et al. | 252/95 |
| 3,535,262 | 10/1970 | Hubbuch et al. | 252/186.33 |
| 3,582,376 | 6/1971 | Ames | 106/287.17 |
| 3,639,284 | 1/1972 | Long | 23/313 R |
| 3,660,068 | 5/1972 | Wilson | 23/313 R |
| 3,924,037 | 12/1975 | Sullivan | 52/315 |
| 4,023,955 | 5/1977 | Mueller | 71/28 |
| 4,040,850 | 8/1977 | Kyri et al. | 106/87 |
| 4,064,212 | 12/1977 | Kleeberg et al. | 264/117 |
| 4,070,300 | 1/1978 | Moroni et al. | 252/190 |
| 4,082,533 | 4/1978 | Wittenbrook et al. | 71/28 |
| 4,112,035 | 9/1978 | Lawrence et al. | 264/117 |
| 4,130,392 | 12/1978 | Diehl et al. | 8/101 |
| 4,218,220 | 8/1980 | Kappler et al. | 8/102 |
| 4,279,764 | 7/1981 | Brubaker | 252/929 |
| 4,349,493 | 9/1982 | Cusberg et al. | 264/117 |
| 4,460,490 | 7/1984 | Barford et al. | 252/92 |
| 4,536,182 | 8/1985 | Tatin | 8/107 |
| 4,575,887 | 3/1986 | Viramontes | 8/158 |
| 4,601,845 | 7/1986 | Namnath | 252/99 |
| 4,655,782 | 4/1987 | McCallion et al. | 8/111 |
| 4,655,953 | 4/1987 | Oakes | 252/99 |
| 4,657,784 | 4/1987 | Olson | 427/213 |
| 4,670,037 | 6/1987 | Kistner | 71/7 |
| 4,711,748 | 12/1987 | Irwin et al. | 23/313 R |
| 4,732,762 | 3/1988 | Sjogren | 424/409 |
| 4,740,213 | 4/1988 | Ricci | 252/187.25 |
| 4,795,476 | 1/1989 | Bean et al. | 8/107 |
| 4,816,033 | 3/1989 | Hoffer et al. | 8/158 |
| 4,850,156 | 7/1989 | Bellaire | 51/293 |
| 4,900,323 | 2/1990 | Dickson et al. | 252/186.43 |
| 4,919,842 | 4/1990 | Dickson et al. | 252/186.43 |

FOREIGN PATENT DOCUMENTS

| | | |
|---|---|---|
| 0238779A1 | 10/1986 | European Pat. Off. . |
| 238779 | 3/1987 | European Pat. Off. . |
| 0275432A1 | 12/1987 | European Pat. Off. . |
| 2311964 | 9/1972 | Fed. Rep. of Germany . |
| 3636387A1 | 10/1986 | Fed. Rep. of Germany . |
| 842224 | 7/1960 | United Kingdom . |
| 2118463A | 11/1983 | United Kingdom . |

OTHER PUBLICATIONS

Manufacturing Clothier, United Trade Press, "All Shook Up" London Nov. 1986 pp. 27–31.
"Tableting" Chemical Engineering Dec. 4, 1967 pp. 151–155.
"Agglomeration" Chemical Engineering Oct. 1951 pp. 161–173.
Letter dated Jan. 3, 1991-Levstik to Gabric.
Letter dated Feb. 7, 1991-Gabric to Levstik with enclosures.
Chem. Abstracts 114:209148w re U.S. Ocean Wash Application No. 360,982, Jun. 1, 1989 and Intern'l. Appln. WO 15180.
European Search Report from European Appln. corresponding to U.S. Pat. No. 4,961,751 to Eissele, et al., a grandparent to the instant application.
Letter from George L. Murry to Mark dated Apr. 15, 1987.
Teledyne Readco literature describing a pelletizing machine.

*Primary Examiner*—R. Bruce Breneman
*Attorney, Agent, or Firm*—Fitch, Even, Tabin & Flannery

[57] ABSTRACT

Permanganate-containing pellets for gradual release or permanganate comprise an integrated body of a hydratable, self-curing cement in cured, hydrated form, and finely-divided particles of a water-soluble permanganate salt in substantially uniform distribution therein. The pellets are formed from a mixture of the permanganate salt, hydratable self-curing mineral cement, and water.

41 Claims, No Drawings

PERMANGANATE-CONTAINING PELLETS AND METHOD OF MANUFACTURE

RELATED APPLICATIONS

This application is a continuation-in-part of co-pending applications Ser. No. 188,419, filed Apr. 29, 1988, now U.S. Pat. No. 4,961,751, and Ser. No. 279,941, filed Dec. 5, 1988, now abandoned."

FIELD OF INVENTION

This invention relates to the use of water-soluble permanganate salts as oxidizing agents. More particularly, the invention relates to the incorporation of permanganates in carriers to facilitate controlled release of the permanganate.

BACKGROUND OF INVENTION

Potassium permanganate and other bleaching or oxidizing agents have been encapsulated or adsorbed on support materials or embedded in formed bodies. See, for example, U.S. Pat. Nos. 3,535,262, 4,279,764, 4,460,490, 4,665,782, 4,657,784, and 4,711,748. German Patent 2,311,964 describes the preparation of a product for decontaminating radioactive waste containing manganese dioxide ($MnO_2$) in Plaster of Paris (gypsum). A slurry is formed from manganese sulfate ($MnSO_4$) and potassium permanganate ($KMnO_4$) and gypsum which is cast into blocks. The $MnSO_4$ and $KMnO_4$ react in the slurry to form the $MnO_2$, which is dispersed throughout the gypsum mass and removed radionuclides by adsorption.

U.S. Pat. No. 4,740,213 describes the impregnation of pumice granules or other absorbent material with an aqueous solution of a bleaching agent such as sodium hypochlorite. Permanganate bleaching agents are not specifically disclosed. The liquid bleaching agent is held in the capillary passages of the natural pumice. In use, the liquid bleaching agent is transferred from the interior of the granules to a substrate contacted by the granules, such as denim fabrics being bleached by contact with the granules in a tumbling operation.

SUMMARY OF INVENTION

The method of this invention for manufacturing permanganate-containing pellets employs a hydratable, self-curing mineral cement such as gypsum to form the body or matrix of the pellets. A water-soluble permanganate in the form of solid particles is distributed throughout the body of the pellets. The permanganate can be released by attrition of the surface of the pellets in certain applications such as the tumble bleaching of moist denim fabrics, or for other purposes it can be released by slow extraction. In either case, the permanganate is gradually released. For denim fabric bleaching, for example, pellets can be used for a plurality of bleaching cycles. Where the pellets are immersed in water, the permanganate will gradually solubilize and be released by aqueous extraction.

In the preferred method of manufacturing the pellets, water-soluble permanganate salt and the hydratable, self-curing cement are mixed with water to form a moldable mix. The mixture is formed into the pellets, and the pellets are cured to integrated bodies by hydration of the cement. The hydration removes most of the free water, leaving the interior of the pellets in substantially dry condition. When the permanganate is mixed with the cement in the form of finely divided permanganate particles, it will remain in particulate form during the mixing, forming, and curing of the pellets. If the permanganate is mixed in a concentrated aqueous solution, or if part of the permanganate becomes solubilized during the mixing, it will be reformed into solid particles by removal of the water through hydration. In certain cases, if free water remains within the pellets, they can be subjected to drying to complete the preparation of the pellets.

DETAILED DESCRIPTION

The pellets of this invention are especially suitable for use with potassium permanganate ($KMnO_4$) and sodium permanganate ($NaMnO_4$). However, they can be advantageously used with other water-soluble permanganate salts. The permanganate salt is preferably added to the cement formulation in solid form. For example, $KMnO_4$ can be added as a finely-divided particulate solid, whereas in the case of sodium permanganate addition as a solution may be preferred. With liquid addition and the use of a hydrable self-curing cement, even though the permanganate is added as an aqueous solution, the water-binding action of the cement can leave most of the permanganate as highly dispersed solid particles. The particles are fine to microscopic depending on the method of addition.

Even though some bleaching agents other than potassium or sodium permanganate, i.e., sodium hypochlorite and sodium dichlorocyanurate dihydrate, function as active ingredients in the artificial frosting stones, their performance is at a much lower level than those of permanganate-containing formulations. The preferred choices for high-intensity frosting are combinations of sodium or potassium permanganate in either gypsum or magnesia cements. Where low bleaching intensities are desired (such as in chemically enhanced stone washing), combinations of Na or K permanganate with Portland cement (preferably white cement) can be used.

The pellets of this invention can be prepared with abradable surfaces. More specifically, they comprise cemented aggregates of mineral particles with the permanganate embedded therein in particulate form. The pellets can be formed from low moisture mixes, which may be a paste or thick slurry, which can be formed into the shaped bodies by processes, such as extrusion, molding, agglomeration, etc.

A preferred major component of the stones' matrix material is a self-curing inorganic cement. Gypsum (Plaster of Paris) is particularly desirable. Hydratable gypsum may be used in a similar form as for preparing gypsum wallboard. When mixed with a small amount of water the gypsum will hydrate and set to an integrated solid body. By premixing the hydratable gypsum powder with the particulate bleaching agent, adding a small amount of water to form a thick paste, the artificial stones can be formed with the agent particles dispersed therethrough essentially in encapsulated or embedded form. Even though the porosity of the artificial stones is limited, the bleaching agent can be progressively released either by surface abrasion or prolonged extraction in water.

Depending on the method of aggregation chosen, various commercial forms of gypsum may be used. Unformulated gypsum, in the hemihydrate form, is a rapid setting material, allowing only a very limited time for forming into pellets. Specifically when using extrusion as the aggregation method, the hydration of gypsum is accelerated by the addition of permanganate. The setting rate can be controlled by addition of one or more decelerants, to allow time to mix and form the material into pellets prior to setting. Commercially available slow-set gypsums are usually retarded by addition of an organic component, e.g., citric acid or hydrolyzed protein, which are attacked by the oxidizing agent. The retardants used for this process should be inorganics such as $H_3PO_4$, $NaH_2PO_4$, $Ca(H_2PO_4)_2$, $Na_2B_4O_7$, etc. Elevated temperature and pressure are also accelerants of gypsum setting, so a very dry mixture, which will generate heat and pressure when being worked, should be avoided.

Other self-curing cements include the family of magnesia cements, viz., magnesium oxychloride and magnesium oxysulfate. These cements are also referred to a "Sorel" cements. Further usable cements also include Portland cement (white Portland cement is especially desirable because of its low iron content), Pozzolan cement, calcium aluminate cement, and related cements.

A representative formulation of the pellets are set out below.

| General Formulas for Permanganate-Containing Pellets Formed from Self-Curing Cements | | |
|---|---|---|
| Ingredients | Wt. % Range | Preferred Wt. % |
| Cement* | 70–99.5 | 85–90 |
| Bleaching agent | 0.5–30 | 10–15 |

*May contain additives

For effective use as frosting agents, the bleach-containing solidified cements are formed into suitable lump or pellet form. The size and form can influence the bleaching pattern obtainable in the frosting step. Given comparable tumbling times, the regularity and uniformity of the bleach effect increases with decreasing stone size. Conversely, the larger the pellet, the more spotty and irregular the bleached areas become. Preparation of stones of various sizes can be achieved in a number of ways. For example, the bleach-containing cement paste can be poured into molds of a variety of shapes and sizes. For example, large slabs of 0.5 to 1.5 inches thickness can be formed, and then cut into rectangular or square pieces of 1" to 1.5" side length, or any other desirable dimension. Alternatively, the slabs can be mechanically crushed to give irregular shaped lumps, with desirable size ranges to be separated out by a classifier. As another procedure, the cement paste can be poured directly into individual molds of the desired shape and size. For agglomeration by molding, the water content of the paste should be slightly higher to make it pourable) than for the aggregation methods described below. Pellets suitable for frosting or garments can also be made by extrusion, disk pelletization, briquetting, tabletting, or other methods familiar to those skilled in the art.

For example, 60 to 95 parts of a slow setting gypsum material (preferred 80 to 90 parts) are mixed with 5 to 15 parts of $KMnO_4$ and 0 to 25 parts of a thickener (preferred 0 to 10 parts), and water sufficient to form a stiff dough. This dough can then be formed into pellets by any method familiar to those skilled in the art; for example, by extrusion, or by rolling between textured rolls, or by pelletization, etc. Once formed, the pellets are self-drying and self-hardening due to the rehydration and setting of the gypsum. The amount of $KMnO_4$ used is an added control of bleaching intensity, along with tumbling time, and weight ratio or garments to pellets selected during the "frosting" step of this process.

This invention is further illustrated by the following examples.

EXAMPLE I

A measured quantity of crystalline or powdered potassium permanganate is dry mixed with a predetermined amount of filler. After a homogeneous blend is obtained, a predetermined quantity of binder plus the proper amount of water is worked in the mixture so that an extrudable mass is obtained. This, in most cases, represents a still powdery but slightly cohesive material. The mass is then extruded to form $\frac{1}{8}$" to $\frac{1}{2}$" diameter rounds of about $\frac{3}{4}$" to $1\frac{1}{2}$" in length. The sizes and shapes of the product are selected for convenience and maximum production rate. Diameters of about 1/16" or even less or of 1" or more are possible. Instead of rounds, other geometrical shapes such as triangular, rectangular, or stars can be used. After extrusion, the product is cured at either ambient or elevated temperature 60°–110° C.). Curing at higher temperatures produces products of higher hardness and with slower release characterization.

The extruded product, containing about 10% $KMnO_4$ or about 12% $K_2MnO_4$) is tumbled with damp denim garments for a period of 5 to 30 minutes. The weight ratio between the quantity of frosting agent and dry garment weight may range from 4 to 0.1, depending on the degree of bleaching desired. In the course of the tumbling operation the extruded pellets are abraded, being finally reduced to a powder. In this manner, the garments make large number of contacts with the permanganate-containing extrudates of various sizes, whereby each contact produces localized bleaching action.

After completion of the frosting step, the garments are treated with a reducing agent—commonly sodium metabisulfite—to remove the brown stains of manganese dioxide.

EXAMPLE II 89 lb gypsum was mixed with 1 lb $Ca(H_2PO_4)_2$ (to retard hydration) and 10 lb $KMnO_4$ crystals, forming a uniform dry blend. Water was added to this blend in a high shear mixer to form a wet dough, which was then extruded through a die plate having $\frac{1}{2}$" square holes. The soft pellets formed were fed onto a moving belt to set.

About 20 lb of water was used in forming this dough. As the gypsum hydrates, it uses about 15 lb of the water present $CaSO_4 \frac{1}{2} H_2O + 1.5 H_2O \rightarrow CaSO_4 2 H_2O$), the heat of hydration causing vaporization of part of the remaining water. Some free water apparently remained in a highly dispersed form. A hard, dry plaster pellet containing $KMnO_4$ crystals was obtained.

EXAMPLE III 260 g of slow setting gypsum was intimately mixed with 72 ml of a commercial 40% solution of sodium permanganate and 30 ml of water. The resulting deep purple paste was transferred into plastic molds of about 3.5 ml volume each. The mass began to stiffen after about 20 minutes and was set after 45 minutes, at which point the gypsum castings were removed from their molds. The black cherry colored pieces contained 10.3% sodium permanganate in a highly dispersed form.

A frosting test with this product 50 g frosting agent with 60 g blue denim tumbled for 30 minutes) showed high intensity, high contrast bleaching.

EXAMPLES IV to IX

Additional stone formulations and test results are summarized in Table A.

TABLE A

| Example No. | Quantity & Kind of Cement Used | Quantity & Kind of Bleaching Agent Used | Water Used | Thickening Time | Set Time | Hardness | Results of Frosting Test |
|---|---|---|---|---|---|---|---|
| IV | Magnesia cement 50 g MgO + 120 ml saturated $MgCl_2$ solution | 25 g $KMnO_4$ (solid) | — | 1 hr | 2.5 hr | hard | low intensity bleaching |
| V | Magnesia cement 50 g MgO + 66 g $MgCl_2.6 H_2O$ | 45 mL = 63 g 40% $NaMnO_4$ | 58 mL | 1 hr | 2.5 hr | hard | high intensity bleaching |
| VI | 260 g Portland Cement (white) | 28.9 g $KMnO_4$ (as solid) | 84 mL | 1.5 hr | 6 hr | very hard | very low intensity bleaching |
| VII | 260 g Portland Cement (white) | 52 mL = 72.8 g 40% $NaMnO_4$ | 50 mL | 10 min | 1.5 hr | very hard | moderate intensity bleaching |
| VIII | 260 g Portland Cement (white) | 107.7 g NaOCl solution (17% active chlorine) | none | 25 min | 1 hr | very hard | low intensity bleaching |
| IX | 260 g Portland Cement (white) | 28.9 g sodium dicyanurate dihydrate | 125 mL | 40 min | 1.5 hr | rough, crumbly surface | low intensity bleaching |

We claim:

1. The method of manufacturing permanganate-containing pellets, comprising:
   (a) preparing a formable mixture of a water-soluble permanganate salt, a hydratable self-curing mineral cement, and water for hydration of said cement;
   (b) forming said mixture into pellets; and
   (c) curing said pellets to integrated bodies by the conversion of free water therein to water of hydration, the resulting pellets having said permanganate in the form of solid particles distributed throughout the pellets.

2. The method of claim 1 in which said cement is gypsum.

3. The method of claims 1 or 2 in which said permanganate salt is selected from the group consisting of potassium and sodium permanganate.

4. The method of claim 1 or 2 in which solid particles of said permanganate salt are combined with said cement to form said mixture.

5. The method of claims 1 or 2 in which said mixture comprises an extrudable dough which is formed by extrusion to produce elongated, rod-shaped pellets.

6. The method of claims 1 or 2 in which said formed and cured pellets contain on a weight basis from 0.5 to 30% of said permanganate salt.

7. The method of manufacturing permanganate-containing pellets, comprising:
   (a) preparing a formable mixture of hydratable gypsum and a water-soluble permanganate selected from the group consisting of potassium and sodium permanganate, said mixture containing sufficient water to permit said mixture to be formed and said gypsum to be at least partially hydrated, said permanganate being in a finely-divided particulate form;
   (b) forming said mixture into pellets while substantially maintaining said permanganate in particulate form; and
   (c) curing said pellets to integrated bodies, the resulting pellets having said permanganate in the form of solid particles distributed throughout the pellets.

8. The method of claim 7 in which said formed and cured pellets contain on a weight basis from 0.5 to 30% of said permanganate.

9. The method of claim 7 or claim 8 in which said mixture comprises an extrudable dough which is formed by extrusion to produce elongated, rod-shaped pellets.

10. The pellets produced by the method of claim 1.

11. The pellets produced by the method of claim 7.

12. The pellets produced by the method of claim 9.

13. Permanganate-containing pellets for the gradual release of permanganate, the pellets comprising hydratable self-curing cement in cured, hydrated form, and finely-divided particles of a water-soluble permanganate salt distributed throughout the pellet.

14. The pellets of claim 13 in which said cement is gypsum and said permanganate salt is potassium permanganate.

15. The pellets of claims 13 or 14 in which said permanganate salt is present in a weight basis in an amount of from 0.5 to 30%.

16. Permanganate-containing pellets for gradual release of permanganate, the pellets comprising hydrated gypsum with finely-divided particles of water soluble permanganate salt selected from the group consisting of potassium permanganate and sodium permanganate distributed throughout the pellet.

17. The pellets of claim 13 in which said cement is white Portland cement.

18. The pellets of claim 13 in which said cement is Sorel cement.

19. The permanganate-containing pellets of claim 13 in which said cured, hydrated cement is abradable to a powder for attrition release of the permanganate particles.

20. An abradable pellet comprising:
   from about 70 to about 99.5 weight percent hydrated cured cement; and
   from about 0.5 to about 30 weight percent of solid particles of a water soluble permanganate salt distributed throughout the abradable pellet.

21. An abradable pellet as recited in claim 20 wherein the pellet comprises from about 85 to about 90 weight percent cement and from about 10 to about 30 weight percent permanganate salt.

22. An abradable pellet as recited in claim 20 or 21 wherein the permanganate salt is selected from the group consisting of sodium permanganate, potassium permanganate and mixtures thereof.

23. An abradable pellet as recited in claim 22 wherein the cement is gypsum.

24. An abradable pellet as recited in claim 22 wherein the cement is Sorel cement.

25. An abradable pellet as recited in claim 22 wherein the cement is Portland cement.

26. An abradable pellet as recited in claim 22 wherein the cement is Pozzolan cement.

27. The method of manufacturing permanganate-containing pellets, comprising:
 mixing water soluble permanganate salt, a hydratable self-curing mineral cement and water for hydration of the cement to provide a formable mixture, the water in an effective amount to hydrate the cement;
 forming the formable mixture into pellets;
 and curing said pellets into solid abradable pellets by the conversion of free water in the formable mixture to water of hydration, the resulting abradable pellets comprising from about 70 to about 99.5 weight percent cement and from about 0.15 to about 30 weight percent permanganate salt particles distributed throughout the pellets.

28. A method as recited in claim 27 wherein said pellets comprise from about 85 to about 90 weight percent cement and from about 10 to about 30 weight percent permanganate salt.

29. A method as recited in claims 27 or 28 wherein the permanganate salt is selected from the group consisting of sodium permanganate, potassium permanganate and mixtures thereof.

30. An abradable pellet as recited in claim 29 wherein the cement is gypsum.

31. An abradable pellet as recited in claim 29 wherein the cement is Sorel cement.

32. An abradable pellet as recited in claim 29 wherein the cement is Portland cement.

33. An abradable pellet as recited in claim 29 wherein the cement is Pozzolan cement.

34. The method of manufacturing permanganate-containing pellets, the method comprising:
 mixing a hydratable cement selected from the group consisting of gypsum, magnesia cement, Portland cement, Pozzolan cement and calcium aluminate cement, a permanganate salt selected from the group consisting of potassium permanganate, sodium permanganate and mixtures thereof, and water, to provide an extrudable mass, the water being in an effective amount to hydrate the cement and provide the extrudable mass;
 extruding the extrudable mass to provide an extruded product;
 drying the extruded product to provide solid abradable pellets comprising from about 70 to about 99.5 weight percent cement and from about 0.5 to about 30 weight percent permanganate salt particles distributed throughout the pellets.

35. A method as recited in claim 34 wherein the solid abradable pellets comprise from about 70 to about 99.5 weight percent cement and from about 0.5 to about 30 weight percent permanganate salt particles.

36. A pellet as recited in claim 13 wherein the pellet has at least about 0.5 weight percent permanganate salt.

37. A pellet as recited in claim 13 wherein the cement is gypsum.

38. A pellet as recited in claim 13 wherein the cement is Sorel cement.

39. A pellet as recited in claim 13 wherein the cement is Portland cement.

40. A pellet as recited in claim 13 wherein the cement is Pozzolan cement.

41. A pellet as recited in claim 16 wherein the pellet has at least about 0.5 weight percent permanganate salt.

* * * * *